Oct. 19, 1965  E. FREUDLING  3,212,800
PROCESS FOR TYING A KNOT
Original Filed June 4, 1963  6 Sheets-Sheet 1
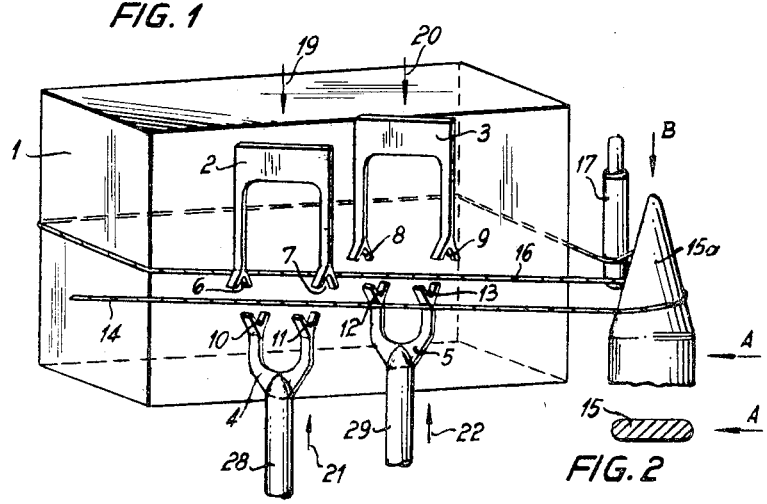
FIG. 1
FIG. 2
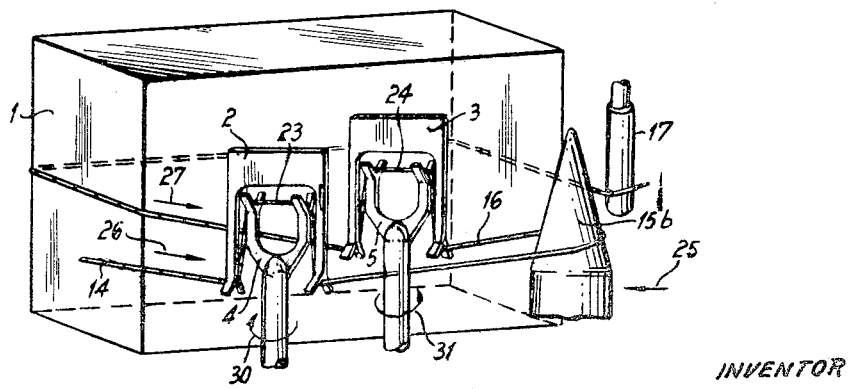
FIG. 3
INVENTOR
Erwin Freudling
by
Michael J. Striker Oct. 19, 1965  E. FREUDLING  3,212,800
PROCESS FOR TYING A KNOT Original Filed June 4, 1963  6 Sheets-Sheet 3

INVENTOR
Erwin Freudling
by
Michael J. Striker

Oct. 19, 1965    E. FREUDLING    3,212,800
PROCESS FOR TYING A KNOT
Original Filed June 4, 1963    6 Sheets-Sheet 4

INVENTOR
Erwin Freudling
by
Michael J. Striker
Atty

Oct. 19, 1965  E. FREUDLING  3,212,800
PROCESS FOR TYING A KNOT
Original Filed June 4, 1963  6 Sheets-Sheet 5
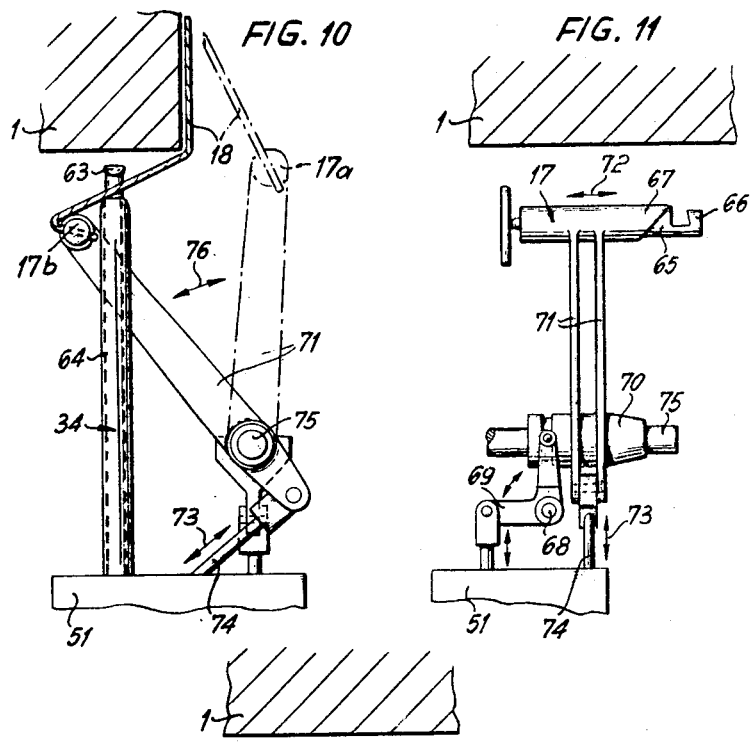
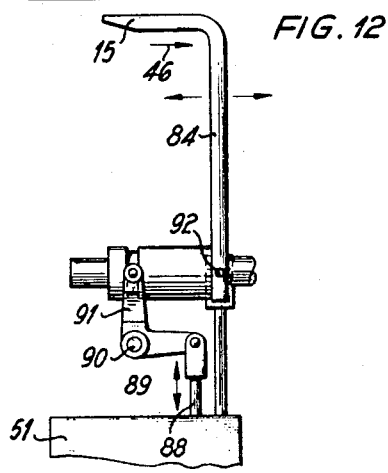
INVENTOR
Erwin Freudling Oct. 19, 1965   E. FREUDLING   3,212,800
PROCESS FOR TYING A KNOT
Original Filed June 4, 1963   6 Sheets-Sheet 6

INVENTOR
Erwin Freudling by Michael J. Strikes

United States Patent Office 3,212,800
Patented Oct. 19, 1965

3,212,800
PROCESS FOR TYING A KNOT
Erwin Freudling, Leiblstrasse 3, Bayreuther, Germany
Original application June 4, 1963, Ser. No. 285,258.
Divided and this application Mar. 19, 1964, Ser. No. 353,109
Claims priority, application Germany, June 5, 1962, F 36,994
7 Claims. (Cl. 289—1.5)

This application is a division of my copending application Serial No. 285,258, filed June 4, 1963, entitled "Method and Apparatus for Tying a Knot."

The present invention relates to a method for tying a knot in a strap, and more particularly to a method for forming a square knot in a strap extending about an object, such as a package.

It is one object of the present invention to achieve the tying of a knot by a simple and inexpensive apparatus.

Another object of the present invention is to provide a method for tying a square knot in such a manner that the tying can be effected automatically by a simple apparatus.

Another object of the invention is to provide a method for tying a square knot by a fast operation requiring little time.

Another object of the present invention is to tie the ends of a piece of a strap extending about a package by a square knot in an automatic operation which can be successively applied to a series of packages.

With these objects in view, one method according to the present invention comprises the steps of laying a piece of a strap about an object; holding one end of the piece in such a manner that two substantially parallel strap sections are formed; forming in the strap sections open loops; turning the open loops to form crossed loops; moving the other end of the piece through the crossed loops; and pulling the ends of the piece apart to form a square knot.

According to the preferred method of the invention, the open loops are substantially U-shaped and located in parallel planes, and the open U-shaped loops are turned about 180° to form the crossed loops. The open loops are made by moving four points of each strap section transversely relative to each other, and the crossed loops are formed by turning the inner points, while the two outer points are held stationary. Perferably, the strap sections are slackened while the loops are being formed to provide the length of the strap necessary for the loops.

The crossed loops are located in parallel planes, and aligned with each other, so that a threading means can first pass in one direction through the crossed loops to grip the other end of the piece of the strap, and then moved in the opposite direction to pull the end of the strap through the crossed loops. When the threading means is then again moved in the opposite direction, while the loop forming means release the crossed loops, the loops are tightened. By further pulling apart the ends of the strap, a tight knot is formed directly abutting the package which is thus surrounded by a closed loop.

At the beginning of the operation the length of the piece is sufficient for forming the crossed loops when the strap piece is slackened. In this manner, it is not necessary to pull the strap material necessary for the formation of the crossed loops, from the supply of the strap material whereby friction losses are substantially reduced.

At the end of the operation, the excess length of the strap material is pulled in the direction of the supply means, while the part of the strap in which the knot is formed is moved, toward the package. In this manner, the result is achieved that at the end of the tying operation, the strap tightly surrounds the package while the excess material, necessary for the formation of the loops, is returned to the supply means.

In the preferred embodiment of the invention, loop forming means engage the strap at four spaced points. However, loop forming means engaging the strap on three points only are sufficient for forming first an open loop and then a crossed loop by turning the engaged points of the strap relative to each other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary schematic perspective view illustrating the initial position of the apparatus;

FIG. 2 is a fragmentary cross sectional view of a holding member for the strap;

FIG. 3 is a fragmentary schematic perspective view illustrating the loop-forming means in an operative position for forming U-shaped loops;

FIG. 10 is a view illustrating the apparatus for operating holding means for one end of the strap;

FIG. 11 is a side elevation of the device shown in FIG. 10;

FIG. 12 is a view of the apparatus for operating the holding member; and

Figure 13:
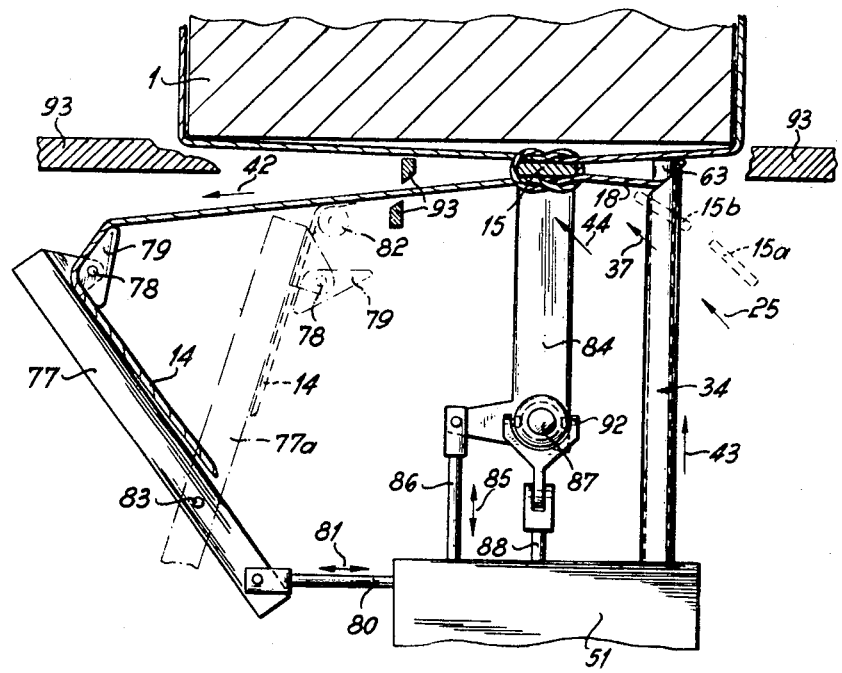
FIG. 13 is a view illustrating the parts of the apparatus by which the knot is finally tightened.

Referring now to the drawings, and more particularly to FIGS. 1 to 8, a strap, rope, twine, string or thread is laid in a loop about a package 1. One end of the piece of the strap is laid about a holding member 15 to form two co-extensive and preferably parallel strap sections 14 and 16. The holding means for the strap end 14 is not shown in FIG. 1, but is illustrated in FIG. 13 to be a lever 77 supporting a clamping lever 79 for turning movement about the pivot pin 78. The strap end 14 is guided about a roll 82, and at the beginning of the operation, the holding means 77 is near the position illustrated in chain lines in FIG. 13. The other end 18 of the strap piece is clamped in a second holding means 17 which is best seen in FIG. 11. Holding means 17 includes a tubular element 67, and a rod 65 shiftable within tubular member 67 in the directions of the arrow 72. A hook-shaped gripping portion 66 will clamp the strap end 18 when strap 65 is moved into tubular member 67, as will be described hereinafter in greater detail. The holding member 15 is flat, and tapers to form a pointed end, and at the beginning of the operation, the strap passes about a wider portion of holding member 15.

First holding means including a pair of U-shaped holding members 2 and 4, and second holding means including a pair of U-shaped holding members 3 and 5 are arranged in parallel planes passing through the strap sections 14 and 16. The legs of the U-shaped members 2 and 3 are spaced greater distances than the legs of the U-shaped members 4 and 5, so that the loop-forming members can be moved in a direction transverse to the direction of straps 14 and 16 to the operative position shown in FIG. 3. The legs of the U-shaped members 2 and 3 have fork-shaped free ends 6, 7, 8, and 9, and the legs of the U-shaped members 4 and 5 have fork-shaped end portions 10, 11, 12 and 13. When the loop-forming means are moved to the operative position shown in FIG. 3, fork-shaped end portions 6, 7, 10, 11 engage four spaced points of strap section 14, and fork-shaped end portions 8, 9, 12, 13 engage four spaced points of strap sections 16, so that open U-shaped loops 23 and 24 are formed in strap sections 14 and 16. Since strap material is required for forming the loops 23 and 24, the strap sections 14 and 16 are slackened, which is accomplished by moving the holding member 15 in the direction of the arrow 25, and the holding means 77 may also be further moved to the right as viewed in FIG. 13.

Loop-forming members 4 and 5 are now turned through an angle of 180° to the position illustrated in FIG. 4 so that the open U-shaped loops 23 and 24 are transformed into the loops 32 and 33 shown in FIG. 4, and these loops will be hereinafter referred to as "crossed loops." Holding member 15 moves further in the direction of the arrow 37 to supply material for the formation of the crossed loops. The crossed loops 32 and 33 are located in parallel planes, and register with each other so that a threading means 34 can first be moved in the direction of the arrow 35 to the position of FIG. 5 in which a gripper means 63 thereon engages the end portion 18 of the strap piece, whereupon the same is released by the holding means 17.

Figure 6:
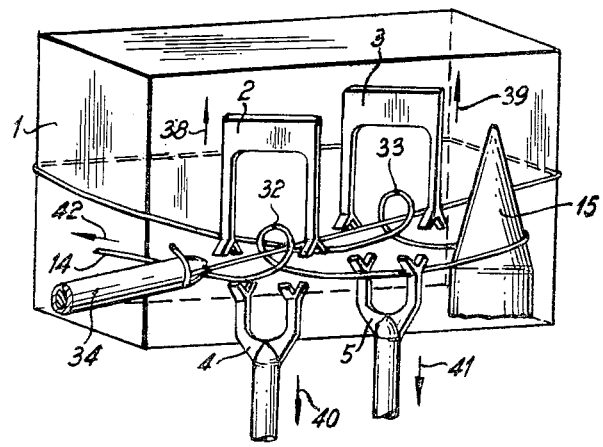
FIG. 6 is a fragmentary schematic perspective view illustrating another position of the threading means, and the release of the crossed loops by the loop-forming means.

Thereupon the threading means 34 moves to the position of FIG. 6 and pulls the end of the strap piece through loops 32 and 33, which are simultaneously released by the loop-forming members 2, 3, 4, 5 which move apart to an inoperative position. At the same time, holding means 77 is moved to the left as viewed in FIG. 13 to tighten the crossed loops 32 and 33.

Figure 7:
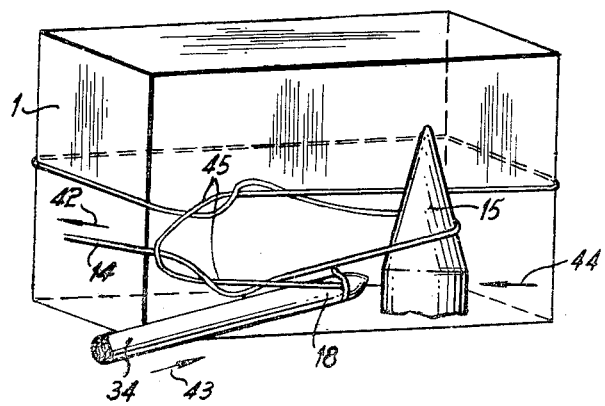
FIG. 7 is a fragmentary schematic perspective view illustrating the positions of the threading means and holding member during the tightening of the weaver's knot, the loop-forming means being omitted for the sake of clarity.
Figure 8:
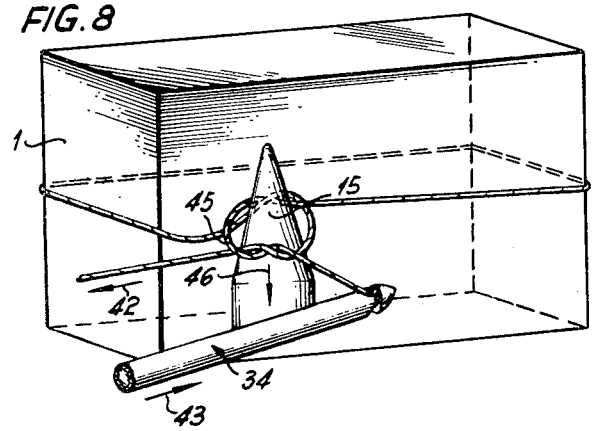
FIG. 8 is a fragmentary schematic perspective view illustrating the holding member and the threading means in a position for further tightening the weaver's knot.

In the following step illustrated in FIG. 7, in which the loop-forming means are omitted for the sake of clarity, the threading means 34 is moved in the direction of the arrow 43 while holding means 77 is moved in the direction of the arrow 42 whereby the ends 14 and 18 of the strap piece are pulled apart and a loose knot 44 is formed through which holding member 15 still passes.

Holding member 15 is moved with the knot 45 toward the surface of the package 1 while the ends 14 and 18 are further pulled apart to reduce the size of the weaver's knot until the same extends around the flat tapered holding member 15. While the ends 14 and 18 are further pulled apart, holding member 15 is moved in the direction of the arrow 46 in FIG. 8 so that the knot is tightened and finally slips off the pointed end of holding member 15 which at this time is in a position directly adjacent the surface of package 1 so that the knotted loop formed about the package tightly surrounds the package. The end 14 of the strap piece is cut off by cutting means 93 adjacent the knot, as best seen in FIG. 13.

Figure 4:
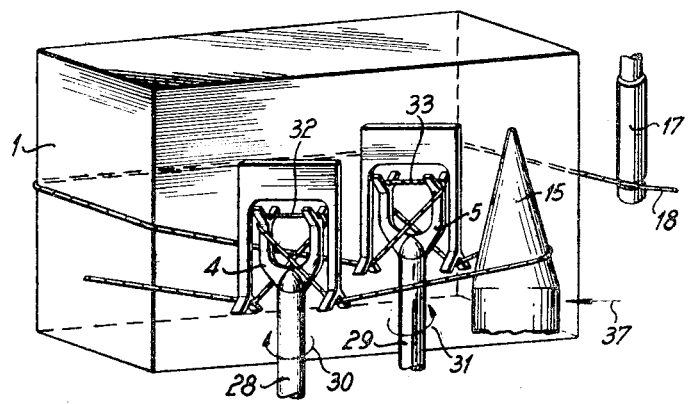
FIG. 4 is a fragmentary schematic perspective view illustrating the loop-forming means in a following position for forming crossed loops.
Figure 5:
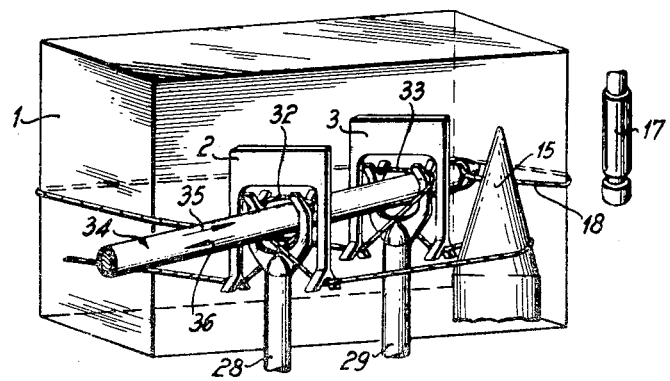
FIG. 5 is a fragmentary schematic perspective view illustrating the operation of the threading means.

As explained above, the additional material required for forming crossed loops 32 and 33 of the open loops 23 and 24 is advantageously provided by moving holding member 15 to the left as viewed in FIG. 4. However, holding members 2, 4 and 3, 5, which move in the directions of the arrows 19, 20, 21 and 22 for forming the U-shaped open loops 23 and 24, may be also moved opposite to the directions of these arrows during the turning movement of loop-forming members 4 and 5 to provide the additional length of strap necessary for transforming the U-shaped loops 23 and 24 into crossed loops 32 and 33.

It will be appreciated that particularly due to the fork-shaped ends of the loop forming members 2, 4, 3, 5, any strap material may be used for the apparatus of the invention, including twine, rope, thread, and wires of various diameters.

Figure 9:
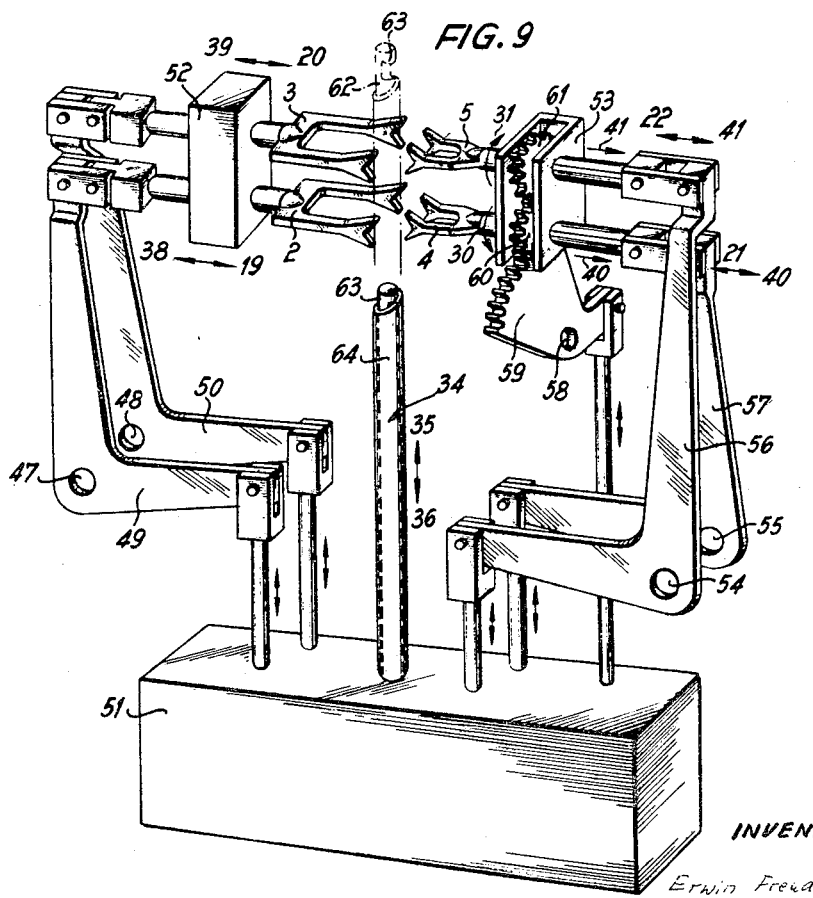
FIG. 9 is a fragmentary perspective view illustrating the apparatus for operating the loop-forming means and threading means.

The mechanism for performing the operations described with reference to FIGS. 1 to 8, will now be described with reference to FIGS. 9–13. Referring first to FIG. 9, it will be seen that the loop-forming members 2, 3 are mounted on shafts which are supported in a support 52 for movement in the directions of the arrows 19, 38 and 20, 39. The ends of the shafts are pivotally connected with the ends of a pair of bell-crank levers 49 and 50 having bores 47, 48 through which a stationary shaft, not shown, passes. The other ends of levers 49 and 50 are articulated to a pair of rods 49a and 50a which are reciprocated in the direction of the arrows 49b and 50b by cam followers and rotary cams, not shown, which are of a conventional nature and form part of schematically illustrated control means 51.

The loop-forming members 4 and 5 are connected for rotation with gears 60 and 61 which are turnable in the direction of the arrows 30 and 31 with loop-forming members 4 and 5. Shafts 4a and 5a are connected to the loop-forming members 4 and 5 for axial movement and are mounted in blocks 4b and 5b which are pivotally connected with the ends of a pair of bell crank levers 56 and 57 so that shafts 4a and 5a, and loop-forming members 4 and 5 can be moved in the directions of the arrows 21, 40 and 22, 41. Levers 56 and 57 have bores 54 and 55 through which a stationary shaft, not shown, passes, and are operated by rods 56a and 57a which are controlled by cam followers engaging cam grooves in rotary cams, not shown, forming part of the control means 51.

Gear 60 meshes with the gear segment 59 having a bore 58 through which a shaft, not shown, passes so that gear segment 59 can be pivoted by operation of a rod 59a which is controlled by rotary cam means, not shown, provided in the control means 51. Turning of gear segment 59 will result in turning of the loop-forming members 4 and 5 through 180°, as described with reference to FIGS. 4 and 5.

The threading means 34 includes a rod 62 having at the end a gripper means 63 which is moved into the tubular member 64 of threading means 34 under the control of a cam follower and rotary cam means, not shown, provided in the control means 51. As explained with reference to FIG. 5, the gripper means 63 is operated for gripping the strap end 18.

It is evident that rotation of the cams, not shown, in the control means 51 will cause successive movements and operations of the loop-forming members and of the threading means 34 in the timed sequence described with reference to FIGS. 1 to 8.

FIGS. 10 and 11 show the mechanism for operating the holding means 17 for the strap end 18. A sleeve 67 is movable in the direction of the arrow 72 along a stationary rod 65 provided with a hook-shaped gripper 66. When the hook-shaped gripper 66 is located within the tubular member 67, the strap end 18 is clamped as shown in FIGS. 4 and 10. In the position 17b shown in FIG. 10, the gripper 63 of the threading member 35 is about to engage the strap end 18, while the gripper 66 of the holding means 17 in the position of FIGS. 5 and 11 releases the strap end 18. In order to place strap end 18 in the region of operation of the gripper 63 of threading means 34, lever 71 turns from the position 17a shown in chain lines in FIG. 10 to the position 17b shown in solid lines in FIG. 10.

The clamping movement of the tubular member 67 is controlled by the control means 51 inasmuch as cam means, not shown, control a cam follower connected to a linking rod which turns a bell-crank lever 69 whose fork end has a pair of pins extending into an annular groove in a sleeve 70 which is slidable along a stationary shaft 75. Lever 71 includes two lever arms secured to sleeve 70 and to tubular member 67.

The turning movement of lever 71 in the direction of the arrow 76 in FIG. 10 is accomplished by a rod 74 pivotally connected to the free end of lever 71, and being moved in the direction of the arrow 73 by cam means and cam follower means, not shown, which operate in timed relation with the other cams of the control means 51.

The strap end 14 is connected to a coil of strap material mounted on a reel, not shown. Cam means, not shown, in control means 51 operate a linking rod 80 in the direction of the arrow 81, as shown in FIG. 13, whereby holding lever means 77 is turned about a pivot 83. A clamping lever 79 is mounted on the free end of holding lever means 77 for turning movement about pivot 78, and the strap end 14 is threaded between clamping lever 79 and holding lever 77. To provide sufficient slack for the formation of the knot, holding lever means 77a is placed in the position shown in chain lines in FIG. 13 in which clamping lever 79 drops to the illustrated position in which free passage of strap end 14 between clamping lever 79 and holder lever means 77 is possible. A stationary roller 82 guides the strap end 14 along holding lever 77 in the position 77a. When holding lever 77 is turned to the position shown in solid lines in FIG. 13, the pressure of the strap on clamping lever 79 turns the same in clockwise direction so that the strap end 14 is clamped between holding lever means 77 and clamping lever 79, and further movement of holding lever means 77 in counterclockwise direction causes pulling of strap end 14 in the direction of the arrow for tightening the weaver's knot in the positions of FIGS. 7, 8 and 12. The other end 18 of the strap is held by the gripper 63 of threading means 34.

The holding member 15 is an angular end portion of a bell-crank lever 84, as shown in FIGS. 12 and 13. One end of bell-crank lever 84 is operated by linking rod 86 which moves in the direction of the arrow 85 under the control of a cam follower engaging a cam groove in a rotary cam, not shown, of control means 51. Lever 84 is mounted on a sleeve 84a which has an annular groove engaged by the fork arms 91 of a bell-crank lever operated by a linking rod 88 movable in the direction of the arrows 89 under the control of rotary cams, not shown, in control means 51. In this manner, holding member 15 can be shifted in the direction of the arrow 46 to move out of the weaver's knot when the same surrounds holding member 15 in the position shown in FIG. 8 and FIG. 18.

As explained above, holding member 15 is moved between the positions shown in FIGS. 1, 3, 6, 7 and 8 from a position tensioning the strap sections 14 and 16 and the final position supporting the weaver's knot directly adjacent the package 1. This movement is accomplished by turning lever 84 about shaft 87 by operation of linking rod 86, and the successive positions 15a, 15b preceding the final position of holding member 15 are illustrated in broken lines in FIG. 13 together with the arrows 25, 37 and 44 which also appear in FIGS. 3, 4 and 7, respectively. One cutter of the cutting means 93 may also be operated from control means 51, by cam means, cam follower means and a linking rod, not shown.

The operation is started by placing an object or package on a support. Strap material supplied from a supply reel, not shown, is threaded between holding lever 77 and clamping lever 79 in the position shown in broken lines in FIG. 13, and is laid about holding member 15 in the position 15a shown in broken lines in FIG. 13. The strap section 14 between holding means 77, 79 and holding member 14 is located in a plane defined by the U-shaped loop-forming members 2 and 4 which are in the inoperative position shown in FIGS. 1 and 9. The strap is laid about the package 1, and its other end is clamped in the second holding means 17 in the position 17a shown in broken lines in FIG. 10. A strap section 16 is thus formed which is located in a plane defined by the U-shaped loop-forming members 3 and 5. The planes of the loop-forming means 2, 4 and 3, 5 are parallel. Control means 51 are now driven by a motor, not shown, so that the loop-forming members 2, 4 and 3, 5 move toward each other to the position shown in FIG. 3. At the same time, the control means 51 cause movement of holding member to the position 15b shown in FIG. 13, and holding means 77, 79 may also be turned in clockwise direction as viewed in FIG. 13 to provide sufficient slack in strap sections 14 and 16 for the formation of the U-shaped loops 23, 24.

Control means 51 now cause movement of rod 59a so that gears 60, 61 are turned 180° by gear segment 59, and the loop-forming members 4 and 5 are turned through 180° so as to form two crossed loops 32 and 33. The necessary slack is provided by moving holding member 15 farther in the direction of the arrow 37, or loop-forming members 2, 4 and 3, 5 may be slightly moved apart under the control of the cams of the control means 51. Threading means 34 is actuated by the control means 51 to move in the direction of the arrow 35 through the crossed loops 32 and 33, while lever 71 is operated by control means 51 through rod 74 to turn counterclockwise as viewed in FIG. 10 whereby holding means 17 moves to the position 17b to place the end 18 of the strap in the region of the gripper 63 of threading means 34 which is advanced to the operative position shown in FIGS. 5 and 10.

Control means 51 now cause retraction of threading means 34 to the inoperative position shown in FIG. 6 so that the thread end 18 is threaded through the crossed loops 32 and 33 which are released by the loop-forming members 2, 4 and 3, 5 moving apart under the control of the cams of the control means 51.

Holding means 77, 79 are now operated by control means 51 to turn in counterclockwise direction as viewed in FIG. 13 whereby the end 14 of the strap is clamped by clamping lever 79, whereby the end 14 is pulled in the direction of the arrow 42 to flatten the loops and to form a loose square knot. Threading means 34 still holds with its gripper 63 and end 18, and may perform an advancing movement in the direction of the arrow 43.

Control means 51 cause turning movement of lever 84 in counterclockwise direction as viewed in FIG. 13 so that holding member 15 moves to the position illustrated in dotted lines in FIG. 12, while the knot is further tightened by the movement of holding means 77, 79 until the knot tightly surrounds a wider portion of the tapered holding member 15. Since holding member 15 is now located directly adjacent the package, the strap surrounds the package in a tight loop.

Control means 51 now cause movement of holding member 15 in the direction of the arrow 46 by shifting linking rod 89 and turning lever 91, so that member 15 is moved out of the weaver's knot which is continuously tightened by the movement of holding means 77, 79 to follow the tapering contour of holding member 15 until a small square knot slips off the pointed end of holding member 15, and is then completely tightened by holding means 77, 79, and preferably also by a small motion of threading means 34 in the direction of the arrow 43. When a tight square knot is thus completed, the cutting means 93 may be automatically operated from control means 51, or by the operator, and since the supply end of the strap material is still held by holding means 77, 79, the apparatus is ready for the next operation after all parts have been returned to the initial position thereof by the operation of the control means 51.

All linking rods shown in the drawing to extend into the casing of the control means 51, are operatively connected with cam followers which run into endless cam grooves in rotary cams which are rotated in synchronism under the control of a common shaft, not shown, driven by suitable motor. In this manner, the timed sequence of all operation is assured.

It will be understood that each of the elements described above, or two or more together, may also find a useful application in other types of methods for tying knots differing from the types described above.

While the invention has been illustrated and described as a method for making a square knot in a strap surrounding a package and including making of crossed loops in parallel sections of the strap, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What is claimed as new and desired to be secured by Letters Patent is:

1. A method for trying a knotted loop in a strap, comprising laying a piece of a strap about an object so that the two end portions of said piece project beyond the object; holding one end portion of the piece spaced from the end thereof and bending it upon itself about 180° so as to form two parallel sections in said one end portion; forming in said sections open loops located in parallel planes; turning said open loops to form crossed loops located in parallel planes; moving the other end portion of said piece through said crossed loops; and pulling said end portions of said piece apart whereby a knot is formed of said crossed loops and said sections.

2. A method for tying a knotted loop in a strap, comprising laying a piece of a strap about an object so that the two end portions of said piece project beyond the object; holding one end portion of the piece spaced from the end thereof and bending it upon itself about 180° so as to form two parallel sections in said one end portion; forming in said sections open substantially U-shaped loops located in parallel planes; turning said open U-shaped loops about 180° to form crossed loops located in said parallel planes; moving the other end portion of said piece through said crossed loops; and pulling said end portions of said piece apart whereby a knot is formed of said crossed loops and said sections.

3. A method for tying a knotted loop in a strap, comprising laying a piece of a strap about an object; holding one end of the piece to form two substantially parallel strap sections in said one end; moving four points of each of said strap sections transversely to the direction of said strap sections relative to each other to form in said strap sections open substantially U-shaped loops located in parallel planes; turning the two inner points of each of said four points of said open U-shaped loops about 180° to form cross loops located in said parallel planes; moving the other end of said piece through said crossed ends of said piece apart whereby a knot is formed of said crossed loops and said ends.

4. A method for tying a knotted loop in a strap, comprising laying a piece of a strap about an object so that the two end portions of said piece project beyond the object; holding one end portion of the piece spaced from the end thereof and bending it upon itself about 180° so as to form two parallel sections in said one end portion; forming in said sections open loops while slackening said piece; turning said open loops at least 180° to form crossed loops located in parallel planes; moving the other end portion of said piece through said crossed loops; and pulling said end portions of said piece apart while moving said crossed loops toward the object whereby a knot is formed of said crossed loops and said sections.

5. A method for tying a knotted loop in a strap, comprising laying a piece of a strap about an object; holding one end of the piece to form two substantially parallel strap sections in said one end and holding the other end so that the same is located in the proximity of said one end; moving four points of each of said strap sections transversely to the direction of said strap sections relative to each other to form in said strap sections open substantially U-shaped loops located in parallel planes while slackening said piece; turning the two inner points of each of said four points of said open U-shaped loops about 180° while holding the same to form crossed loops located in said parallel planes; moving the other end of said piece through said crossed loops; releasing said crossed loops and pulling said ends of said piece apart while moving said crossed loops toward the object whereby a knot is formed of said crossed loops and said ends.

6. A method for tying a knotted loop in a strap, comprising laying a piece of a strap about an object so that the two end portions of said piece project beyond the object; holding one end portion of the piece spaced from the end thereof and bending it upon itself about 180° so as to form two parallel sections in said one end portion; moving four points of each of said sections transversely to the direction of said sections relative to each other to form in said sections open substantially U-shaped loops located in parallel planes; turning the two inner points of each of said four points of said open U-shaped loops about 180° to form crossed loops located in said parallel planes; moving the other end portion of said piece through said crossed loops; and pulling said end portions of said piece apart whereby a square knot is formed of said crossed loops and of said sections.

7. A method of tying a knotted loop in a strap, comprising laying a piece of a strap about an object so that the two end portions of said piece project beyond the object; holding one end portion of the piece spaced from the end thereof and bending it upon itself about 180° so as to form two parallel sections in said one end portion, and holding the other end portions so that the same is located in the proximity of the bent part of said one end portion; moving four points of each of said sections transversely to the direction of said sections relative to each other to form in said sections open substantially U-shaped loops located in parallel planes while slackening said piece; turning the two inner points of each of said four points of said open U-shaped loops about 180° while holding the same to form crossed loops located in said parallel planes; moving the other end portion of said piece through said crossed loops; releasing said crossed loops and pulling said end portions of said piece apart while moving said crossed loops toward the object whereby a square knot is formed of said crossed loops and said sections.

References Cited by the Examiner

UNITED STATES PATENTS

| 225,944 | 3/80 | Neale | 289—4 |
| 262,781 | 8/82 | Ingledue | 289—4 |
| 638,243 | 12/99 | Hindley et al. | 289—4 |

FOREIGN PATENTS

| 557,533 | 2/57 | Italy. |
| 567,483 | 6/23 | France. |

DONALD W. PARKER, *Primary Examiner.*